United States Patent [19]

Yamamoto et al.

[11] Patent Number: 5,609,796
[45] Date of Patent: Mar. 11, 1997

[54] DYE CONTAINING POLARIZING FILM

[75] Inventors: Setsuko Yamamoto; Kazuya Ogino; Narutohsi Hayashi, all of Osaka; Takashi Omura, Hyogo, all of Japan

[73] Assignee: Sumitomo Chemical Company, Limited, Osaka, Japan

[21] Appl. No.: 322,620

[22] Filed: Oct. 13, 1994

[30] Foreign Application Priority Data

Oct. 14, 1993 [JP] Japan .................................. 5-257083
Jul. 27, 1994 [JP] Japan .................................. 6-175689

[51] Int. Cl.$^6$ ...................................................... F21V 9/14
[52] U.S. Cl. .......................................................... 252/585
[58] Field of Search .................................. 252/585, 600, 252/582

[56] References Cited

U.S. PATENT DOCUMENTS

| | | | |
|---|---|---|---|
| 4,387,050 | 6/1983 | Nickel . | |
| 4,514,559 | 4/1985 | Sato et al. ................ | 252/585 |
| 4,515,599 | 5/1985 | Käser . | |
| 5,007,942 | 4/1991 | Claussen et al. ......... | 252/585 |
| 5,104,572 | 4/1992 | Ozawa et al. ........... | 252/585 |
| 5,272,259 | 12/1993 | Claussen et al. ......... | 252/585 |
| 5,310,509 | 5/1994 | Okada et al. ............ | 252/585 |
| 5,318,856 | 6/1994 | Misawa et al. .......... | 428/524 |
| 5,340,504 | 8/1994 | Claussen ................. | 252/585 |
| 5,354,512 | 10/1994 | Ogino et al. ............ | 252/585 |
| 5,480,977 | 1/1996 | Ogino et al. ............ | 252/585 |

FOREIGN PATENT DOCUMENTS

| | | |
|---|---|---|
| 0043792 | 1/1982 | European Pat. Off. . |
| 2332310 | 6/1977 | France . |
| 56-86956 | 7/1981 | Japan . |
| 57-106799 | 7/1982 | Japan . |
| 4-333002 | 11/1992 | Japan . |
| 196249 | 5/1938 | Switzerland . |
| 196259 | 6/1938 | Switzerland . |
| 196260 | 6/1938 | Switzerland . |
| 196264 | 6/1938 | Switzerland . |
| 196252 | 6/1938 | Switzerland . |
| 1569259 | 6/1980 | United Kingdom . |
| 2255570 | 11/1992 | United Kingdom . |

OTHER PUBLICATIONS

*Patent Abstracts*, 41749 E/21, Bayer AG, "Dyeing of paper –using copper complexes of azo dyes", (1982).
*Chemical Abstracts*, vol. 118, 1993, abstract No. 118:25694f, Toshiaki Ishibashi et al., "Polarizing films and dichroic azo dyes therefor".

*Patent Abstracts of Japan*, vol. 18, No. 97 (C–1167)(6437), 17 Feb. 1994 & JP–A–05 295 282 (Mitsui Toatsu Chem), 9 Nov. 1993.

*Patent Abstracts of Japan*, vol. 18, No., 122 (C–1173)(6462), 28 Feb. 1994 & JP–A–05 311 086 (Mitsui Toatsu Chem. Inc.), 22 Nov. 1993.

*Database WPI*, Week 9109, Derwent Publications Ltd., London, GB; AN 91–062788 "Water–soluble trisazodye and copper complex dye" & JP–A–3 012 606 (Nippon Kayaku KK), 21 Jan. 1991).

*Primary Examiner*—Philip Tucker
*Attorney, Agent, or Firm*—Watson Cole Stevens Davis, P.L.L.C.

[57] ABSTRACT

A dye-containing polarizing film which comprises at least one dye selected from:

dye represented by the following formula(1):

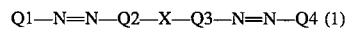

wherein Q1 and Q4 are phenyl or naphthyl group, Q2 and Q3 are phenylen group, X is azo or azoxy, and dye represented by the following formula(2):

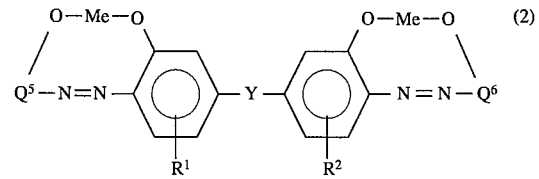

wherein Me is a transition metal selected from copper, nickel, zinc and iron, Q5 and Q6 are 1-naphthol or 2-naphthol residue, Y is azo or azoxy, R1 and R2 are hydrogen, lower alkyl, lower alkoxy or sulfo. The polarizing film exhibits polarizing activities not smaller than those of a iodine containing polarizing film, has excellent durability and does not cause light to break through the film by using several types of the specific dye in combination.

11 Claims, No Drawings

DYE CONTAINING POLARIZING FILM

This invention relates to a polarizing film containing dye.

Currently, polarizing films are generally prepared by incorporating iodine or a dichromatic dye as a polarizing element into an oriented film made of polyvinyl alcohol or its derivatives, or into an oriented polyene film prepared by dehydrochlorination of a polyvinyl chloride film or dehydration of a polyvinyl alcohol film so as to produce polyene in the film, followed by the orientation of the resulting film.

Among those, a iodine-containing polarizing film is good in early stage polarizing activities, but poor in the durability to moisture and heat. Thus, the film has some drawbacks in the lowered polarizing activities after having been used for a certain period of time at a high temperature under a highly humid condition. Several methods for improving the durability have been proposed, in which the film is treated with formalin or aqueous boric acid solution, or a polymer film having a low moisture permeability is employed as a protecting film, but these methods are not yet fully satisfactory.

A dye-containing polarizing films using a dichromatic dye as a polarizing element is superior in the durability to moisture and heat as compared with those in iodine-containing polarizing film, but inferior in the early stage polarizing activities.

If two polarizing films of neutral color containing two or more kinds of dichromatic dyes which are superposed on each other so that those orientation directions meet at right angles (hereinafter, this state is referred to as "crossed state") are pervious to light of a specific wavelength within the visible radiation wavelength region, particularly from 400 to 700 nm, a liquid crystal display using the two films often show a color different from the intended color at dark state.

In order to prevent the problem due to the light breaking through the films, transmittance of the polarizing films at crossed state (hereinafter, this is referred to as "cross light transmittance") must be lowered over the visible radiation wavelength region, particularly from 400 too 700 nm.

An object of the present invention is to provide a polarizing film of neutral color containing two or more kinds of dichromatic dyes which is excellent in the polarizing activities as well as the durability to moisture and heat.

Other object of the present invention is to provide a polarizing film of neutral color containing two or more kinds of dichromatic dyes which is excellent in the polarizing activities as well as the durability to moisture and heat and is little pervious to light over the visible radiation wavelength region, particularly 400 to 700 nm at crossed state.

Further object of the present invention is to provide a dye which can be used suitably for producing said polarizing film.

The present inventors have extensively studied to accomplish these objects, have found that a polarizing film of neutral color containing specific dyes exhibits excellent polarizing activities and durability to moisture and heat and that the films are little pervious to light at crossed state over the visible radiation wavelength region, particularly 400 to 700 nm.

The present invention provides a dye-containing polarizing film which comprises, in a film substrate, at least one dye selected from:

1) a dye represented by the following formula(1):

$$Q^1-N=N-Q^2-X-Q^3-N=N-Q^4 \qquad (1)$$

wherein:

Q1 and Q4, which are the same or different, are each phenyl or naphthyl group which may be optionally substituted;

Q2 and Q3, which are the same or different, are each phenylene group which may be optionally substituted; and X is —N=N— or

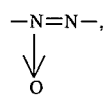

provided that, when X is —N=N— and both of Q2 and Q3 are unsubstituted phenylene groups, at least one of Q1 and Q4 is not phenyl group which is substituted by alkyl-substituted amino and may be further substituted by methyl; and 2) a dye represented by the following formula (2):

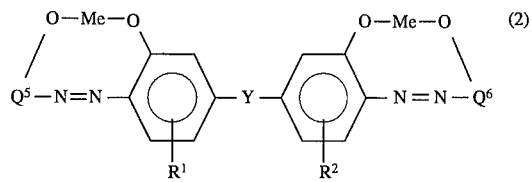

wherein:

each Me is a transition metal selected from copper, nickel, zinc and iron;

Q5 and Q6, which are the same or different, are each 1,2-naphthylene group which may be optionally substituted;

Y is —N=N— or

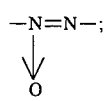

and

R1 and R2, which are the same or different, are each hydrogen atom, lower alkyl, lower alkoxy or sulfo group.

In this specification, the term "lower" used to qualify a group such as alkyl or alkoxy means "having one to about four carbon atoms".

The dye-containing polarizing film of the present invention may further comprises other organic dye. Particularly, it is preferred that the polarizing film further comprises two or more dyes selected from:

[A] a disazo dye represented by the following formula(3),

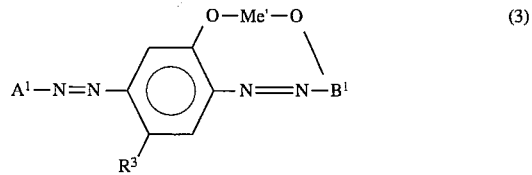

wherein:

Me' is transition metal selected from copper, nickel, zinc and iron;

A1 is phenyl or naphthyl group which may be optionally substituted;

1 is 1,2-naphthylene group which may be optionally substituted; and

R3 is amino group which may be optionally substituted, hydrogen atom, lower alkyl, lower alkoxy or sulfo group;

[B] a trisazo dye represented by the following formula(4) in the free acid form and copper complex salts thereof,

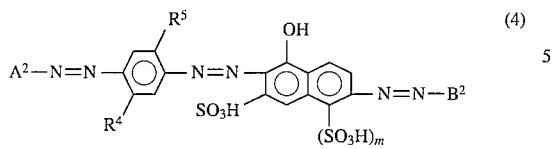 (4)

wherein:

A2 and B2, which are the same or different, are each phenyl or naphthyl group which may be optionally substituted;

R4 is amino group which may be optionally substituted, hydrogen atom, lower alkyl, lower alkoxy or sulfo group;

R5 is hydrogen atom, hydroxy or lower alkoxy group; and m is 0 or 1; and

[C] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

Accordingly, the present invention also provides a dye-containing polarizing film which comprises;

at least one dye selected from a dye of formula(1) and a dye of formula(2); and at least two dyes selected from the group [A], [B] and [C].

Q1 and Q4 in the formula(1), which are the same or different, are each phenyl or naphthyl group. The phenyl or naphthyl group may be optionally substituted. Examples of groups which can be a substituent of the phenyl or naphthyl group denoted by Q1 or Q4 include amino which may be optionally substituted, sulfo, carboxy, hydroxy, lower alkyl and lower alkoxy. Preferably, Q1 and Q4, which are the same or different, are each naphthyl substituted by at least one group selected from amino which may be optionally substituted, sulfo, hydroxy, lower alkyl or lower alkoxy; or phenyl substituted by at least one group selected from amino which may be optionally substituted and hydroxy, and may further substituted by sulfo, carboxy, lower alkyl or lower alkoxy. Among them, particularly preferable as Q1 or Q4 is a naphthyl group substituted by at least one group selected from amino which may be optionally substituted, sulfo, hydroxy, lower alkyl and lower alkoxy.

Q2 and Q3 in the formula(1), which are the same or different, are each phenylene group. The phenylene group may be optionally substituted. Examples of groups which can be a substituent of the phenylene group denoted by Q2 or Q3 include hydroxy, lower alkyl, lower alkoxy and sulfo. Preferably, Q2 and Q3, which are the same or different, are each unsubstituted phenylene group or phenylene group substituted by one or two substituent selected from hydroxy, lower alkyl, lower alkoxy and sulfo. Among the preferable phenylene mentioned-above, p-phenylene group is particularly preferred. Preferred phenylene denoted by Q2 or Q3 can be represented by following formula;

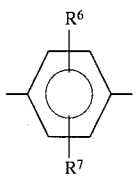

wherein R6 and R7, which are the same or different, are each hydrogen, hydroxy, lower alkyl, lower alkoxy or sulfo.

Q5 and Q6 in the formula(2), which are the same or different, are each 1,2-naphthylene group. The 1,2-naphthylene group may be optionally substituted. Examples of groups which can be a substituent of the 1,2-naphthylene group denoted by Q5 or Q6 include amino which may be optionally substituted, sulfo, hydroxy, carboxy, lower alkyl and lower alkoxy. Preferably, Q5 and Q6, which are the same or different, are each 1,2-naphthylene group which is substituted by at least one substituent selected from unsubstituted amino, substituted amino, sulfo, hydroxy, carboxy, lower alkyl and lower alkoxy.

Me in the formula(2) is a transition metal selected from copper, nickel, zinc and iron. Particularly, copper is preferred.

The amino group as an substituent of Q1, Q4, Q5 or Q6 in the formula(1) or (2) is unsubstituted amino or substituted amino. When the amino group is a substituent of the phenyl group, the substituted amino group is mono-substituted or di-substituted amino group, and examples of the substituent of the amino group include methyl, ethyl, hydroxyethyl, cyanoethyl, acetyl and carbamoyl. When the amino group is a substituent of the naphthyl group, the substituted amino group is mono-substituted or di-substituted amino group, and examples of the substituent of the amino group include methyl, ethyl, hydroxyethyl, cyanoethyl, acetyl, carbamoyl, phenyl, sulfophenyl, disulfophenyl and benzoyl.

The dye-containing polarizing film comprising at least one dye selected from the dye of formula(1) and the dye of formula(2) is excellent in the polarizing activities and in the durability to moisture and heat, that is, the polarizing activities are not lowered and the color is not discolored even after having been used for a certain period of time at a high temperature under a highly humid condition.

The dye of formula(1) can be produced, for example, by mixing a monoazo compound represented by the following formula(5);

$$Q1-N=N-Q2-NO_2 \qquad (5)$$

wherein Q1 and Q2 are as defined above and a monoazo compound represented by the following formula(6);

$$Q4-N=N-Q3-NO_2 \qquad (6)$$

wherein Q3 and Q4 are as defined above, followed by the glucose reduction in aqueous medium. The glucose reduction can be carried out according to a known method, such as a method described in Ind. Eng. Chem.,27, 1045(1935) or J. Am. Chem. Soc., 73, 1323 (1951).

The monoazo compound of formula(5) can be produced, for example, by diazotizing a compound represented by the following formula(5-a) in a usual method;

$$NH_2-Q2-NO_2 \qquad (5-a)$$

wherein Q2 is as defined above, and coupling the resulting diazonium compound with a compound represented by the following formula(5-b);

$$Q1-H \qquad (5-b)$$

wherein Q1 is as defined above.

The monoazo compound represented by the formula(6) can be produced, for example, by diazotizing a compound represented by the following formula(6-a) in a usual method;

$$NH_2-Q3-NO_2 \qquad (6-a)$$

wherein Q3 is as defined above, and coupling the resulting diazonium compound with a compound represented by the following formula(6-b);

Q4—H     (6-b)

wherein Q4 is as defined above.

The dye of formula(2) can be produced, for example, by mixing a monoazo compound represented by the following formula(7),

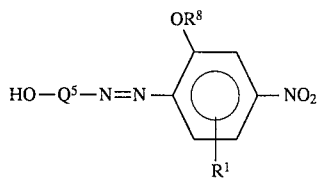 (7)

wherein Q5 and R1 are as defined above and R8 is hydrogen or lower alkyl, and a monoazo compound represented by the following formula(8),

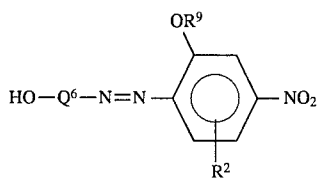 (8)

wherein Q6 and R2 are as defined above and R9 is hydrogen or lower alkyl; and carrying out the glucose reduction in aqueous medium to obtain a trisazo compound or a disazomonoazoxy compound, followed by forming a complex salt of the compound by a reaction with copper, nickel, zinc or iron-containing compound. The glucose reduction can be carried out according to a known method.

The monoazo compound of formula(7) can be produced, for example, by diazotizing a compound represented by the following formula(7-a) in a usual method;

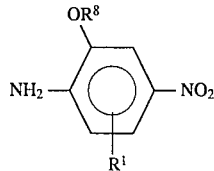 (7-a)

wherein R1 and R8 are as defined above, and coupling the resulting diazonium compound with a compound represented by the following formula(7-b);

HO—Q5—H     (7-b)

wherein Q5 is as defined above.

The monoazo compound of formula(8) can be produced, for example, by diazotizing a compound represented by the following formula(8-a) in a usual method;

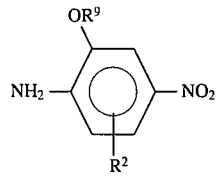 (8-a)

wherein R2 and R9 are as defined above, and coupling the resulting diazonium compound with a compound represented by the following formula(8-b );

HO—Q6—H     (8-b)

wherein Q6 is as defined above.

Examples of the nitroaniline compound of formula(5-a) or (6-a) include 4-nitroaniline, 2-methyl-4-nitroaniline, 2-ethyl-4-nitroaniline, 2-methoxy-4-nitroaniline, 2-ethoxy-4-nitroaniline, 2,5-dimethoxy-4-nitroaniline, 3-sulfo-4-nitroaniline and 2-hydroxy-4-nitroaniline. Among them, 4-nitroaniline and 2-methoxy-4-nitroaniline are preferred.

The compound of formula(5-b) or (6-b) may be unsubstituted or substituted benzene or unsubstituted or substituted naphthalene. Examples of the compound of formula(5-b) or (6-b) include aniline, aniline derivatives, phenol, phenol derivatives, aminophenol, amino phenol derivatives, naphthol, naphthol derivatives, naphthoic acid, naphthoic acid derivatives, naphthylamine sulfonic acid, naphthylamine sulfonic acid derivatives, naphthol sulfonic acid and naphthol sulfonic acid derivatives.

Among them, the following can be mentioned as preferred examples:

phenol, o-cresol, m-cresol, p-cresol, resorcinol, phloroglucinol, m-methoxyphenol, m-aminophenol, 3-(diethylamino) phenol, 5-amino-2-methylphenol, 3-[bis(β-hydroxyethyl)amino]phenol, N,N-bis(β-hydroxyethyl)aniline, 1,3-diamino-4-methylbenzene, salicylic acid, 1,3-diaminobenzene-4-sulfonic acid, 1,3-diaminobenzene-4,6-disulfonic acid, 1-acetylamino-4-methoxy-3-[bis(β-hydroxyethyl)amino]benzene, 3-(diethylamino)phenol, 1-naphthol, 1-hydroxy-2-naphthoic acid, 1-naphthol-4-sulfonic acid, 1-naphthol-5-sulfonic acid, 1-naphthol-3-sulfonic acid, 1-naphthol-3,8-disulfonic acid, 1-naphthol-3,6-disulfonic acid, 1-naphthol-3,6,8-trisulfonic acid, 2-naphthol, 3-hydroxy-2-naphthoic acid, 2-naphthol-8-sulfonic acid, 2-naphthol-7-sulfonic acid, 2-naphthol-6-sulfonic acid, 2-naphthol-6,8-disulfonic acid, 2-naphthol-3,6-disulfonic acid, 1-aminonaphthalene-6-sulfonic acid, 1-aminonaphthalene-7-sulfonic acid, 2-aminonaphthalene-6-sulfonic acid, 2-amino-8-hydroxynaphthalene-6-sulfonic acid, 2-methylamino-8-hydroxynaphthalene-6-sulfonic acid, 2-ethylamino-8-hydroxynaphthalene-6-sulfonic acid, 2-acetylamino-8-hydroxynaphthalene-6-sulfonic acid, 2-propionylamino-8-hydroxynaphthalene-6-sulfonic acid, 2-benzoylamino-8-hydroxynaphthalene-6-sulfonic acid, 2-carbamoylamino-8-hydroxynaphthalene-6-sulfonic acid, 2-sulfamoylamino-8-hydroxynaphthalene-6-sulfonic acid, 2-phenylamino-8-hydroxynaphthalene-6-sulfonic acid, 3-amino-8-hydroxynaphthalene-6-sulfonic acid, 3-methylamino-8-hydroxynaphthalene-6-sulfonic acid, 3-ethylamino-8-hydroxynaphthalene-6-sulfonic acid, 3-acetylamino-8-hydroxynaphthalene-6-sulfonic acid, 3-propionylamino-8-hydroxynaphthalene-6-sulfonic acid, 3-benzoylamino-8-hydroxynaphthalene-6-sulfonic acid, 3-carbamoylamino-8-hydroxynaphthalene-6-sulfonic acid, 3-sulfamoylamino-8-hydroxynaphthalene-6-sulfonic acid, 3-phenylamino-8-hydroxynaphthalene-6-sulfonic acid, 1-amino-5-hydroxynaphthalene-7-sufonic acid, 1-amino-8-hydroxynaphthalene-3,6-disulfonic acid, 1-acetylamino-8-hydroxynaphthalene-3,6-disulfonic acid, 1-amino-8-hydroxynaphthalene-4,6-disulfonic acid, 1-acetylamino-8-hydroxynaphthalene-4,6-disulfonic acid, 1-amino-8-hydroxynaphthalene-2,4-disulfonic acid, 2-amino-8-hydroxynaphthalene-3,6-disulfonic acid, 2-amino-5-hydroxynaphthalene-1,7-disulfonic acid and 1,8-dihydroxynaphthalene-3,6-disulfonic acid.

Among them, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid and 2-amino-5-hydroxynaphthalene-1,7-disulfonic acid are particularly preferred.

Examples of the nitroaniline compound of formula(7-a) or (8-a) include 2-methoxy-4-nitroaniline, 2-methoxy-4-nitro-5-methylaniline, 2,5-dimethoxy-4-nitroaniline, 2-hydroxy-4-nitroaniline and 2-methoxy-4-nitro-5-ethoxylaniline. Among them, 2-methoxy-4-nitroaniline is preferred.

The compound of formula(7-b) or (8-b) is unsubstituted or substituted naphthol. Examples of the compound of formula(7-b) or (8-b) include 1-naphthol, 1-naphthol-4-sulfonic acid, 1-naphthol-5-sulfonic acid, 1-naphthol-3-sulfonic acid, 1-naphthol-3,8-disulfonic acid, 1-naphthol-3,6-disulfonic acid, 1-naphthol-3,6,8-trisulfonic acid, 2-naphthol, 2-naphthol-3-carboxylic acid, 2-naphthol-8-sulfonic acid, 2-naphthol-7-sulfonic acid, 2-naphthol-6-sulfonic acid, 2-naphthol-6,8-disulfonic acid, 2-naphthol-3,6-disulfonic acid, 2-amino-8-hydroxynaphthalene-6-sulfonic acid, 2-methylamino-8-hydroxynaphthalene-6-sulfonic acid, 2-ethylamino-8-hydroxynaphthalene-6-sulfonic acid, 2-acetylamino-8-hydroxynaphthalene-6-sulfonic acid, 2-propionylamino-8-hydroxynaphthalene-6-sulfonic acid, 2-benzoylamino-8-hydroxynaphthalene-6-sulfonic acid, 2-carbamoylamino-8-hydroxynaphthalene-6-sulfonic acid, 2-sulfamoylamino-8-hydroxynaphthalene-6-sulfonic acid, 2-phenylamino-8-hydroxynaphthalene-6-sulfonic acid, 3-amino-8-hydroxynaphthalene-6-sulfonic acid, 3-methylamino-8-hydroxynaphthalene-6-sulfonic acid, 3-ethylamino-8-hydroxynaphthalene-6-sulfonic acid, 1-acetylamino-8-hydroxynaphthalene-6-sulfonic acid, 3-propionylamino-8-hydroxynaphthalene-6-sulfonic acid, 3-benzoylamino-8-hydroxynaphthalene-6-sulfonic acid, 3-carbamoylamino-8-hydroxynaphthalene-6-sulfonic acid, 3-sulfamoylamino-8-hydroxynaphthalene-6-sulfonic acid, 3-phenylamino-8-hydroxynaphthalene-6-sulfonic acid, 1-amino-5-hydroxynaphthalene-7-sufonic acid, 1-amino-8-hydroxynaphthalene-3,6-disulfonic acid, 1-acetylamino-8-hydroxynaphthalene-3,6-disulfonic acid, 1-amino-8-hydroxynaphthalene-4,6-disulfonic acid, 1-acetylamino-8-hydroxynaphthalene-4,6-disulfonic acid, 1-amino-8-hydroxynaphthalene-2,4-disulfonic acid, 2-amino-8-hydroxynaphthalene-3,6-disulfonic acid, 2-amino-5-hydroxynaphthalene-1,7-disulfonic acid and 1,8-dihydroxynaphthalene-3,6-disulfonic acid.

Among them, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid and 2-amino-5-hydroxynaphthalene-1,7-disulfonic acid are particularly preferred.

Among the dyes of formula(1), some types can be produced by a conventional demetalization of the dye of formula(2), such as treating the dye of formula(2) with strong acidic aqueous medium or a demetalization by using a chelating agent such as ethylenediamine tetraacetic acid.

Each of X and Y in formula(1) or formula(2) may be azo group or azoxy group. The dye of formula(1) or formula(2) may be the mixture of the dye wherein X or Y, respectively, is azo group and the dye wherein X or Y, respectively, is azoxy group. The ratio of the dye wherein X or Y is azo group to the dye wherein X or Y is azoxy group varies depending on the reduction conditions. The dye wherein X or Y is an azoxy group or a mixture of the dye wherein X or Y is azo group and the dye wherein X or Y is azoxy group is preferred.

The dye of formula(1) and formula(2) usually have one or more anionic groups such as sulfo or carboxy, which give the dye water solubility. Though the dye having the anionic group usually used in the sodium salt form, it can also be used in the free acid form or in the form of other salt such as lithium salt, potassium salt, ammonium salt, ethanolamine salt or alkyl amine salt.

The dye of formula(1) includes novel compounds. As important examples of the novel compounds, a compound of which the free acid form is represented by the following formula (1-a);

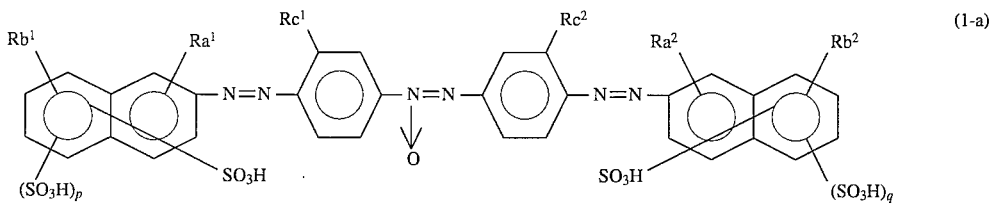

(1-a)

wherein Ra1 and Ra2, which are the same or different, are each hydroxy or amino; Rb1 and Rb2, which are the same or different, are each hydrogen, hydroxy or amino; Rc1 and Rc2, which are the same or different, are each hydrogen, methyl or methoxy; and p and q, which are the same or different, are each 0 or 1; and a compound of which the free acid form is represented by the following formula (1-b);

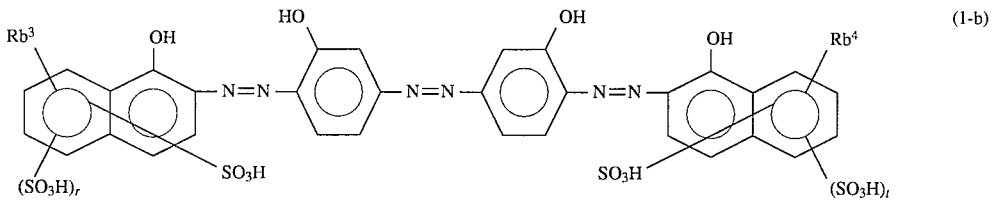

(1-b)

wherein Rb3 and Rb4, which are the same or different, are each hydrogen, hydroxy or amino; and r and t, which are the same or different, are each 0 or 1 can be mentioned.

These compound of the formula(1-a) or (1-b) can be in the form of free acid or in the form of salt, such as lithium salt, sodium salt, potassium salt, ammonium salt, ethanolamine salt or alkylamine salt.

The polarizing film of the present invention comprising at least one dye selected from the dye of formula(1) and the dye of formula(2) may further comprise other organic dyes to modify the color tone or to improve the polarizing activities. As the other organic dyes, any dyes which have high dichromatic activity and also have the absorption ranges different to those of the dyes of formula(1) and (2) can be preferably used. As examples of the other organic dyes, the following can be mentioned:

C.I. Direct Yellow 12, C.I. Direct Yellow 28, C.I. Direct Yellow 44, C.I. Direct Yellow 142, C.I. Direct Orange 6, C.I. Direct Orange 26, C.I. Direct Orange 39, C.I. Direct Orange 107, C.I. Direct blue 1, C.I. Direct blue 15, C.I. Direct blue 71, C.I. Direct blue 78, C.I. Direct blue 98, C.I. Direct blue 168, C.I. Direct blue 202, C.I. Direct Red 2, C.I. Direct Red 31, C.I. Direct Red 79, C.I. Direct Red 81, C.I. Direct Red 240, C.I. Direct Red 247, C.I. Direct Brown 106, C.I. Direct Brown 223, C.I. Direct Violet 9, C.I. Direct Violet 51 and C.I. Direct Green 85.

The polarizing film which comprises at least one dye selected from the dye of formula(1) and the dye of formula(2) and further comprises at least two dyes selected from the above-mentioned group[A], [B] and [C] is more preferred. The more preferred polarizing film has neutral color and is little pervious to light at crossed state over the visible radiation wavelength region, particularly from 400 to 700 nm. The more preferred polarizing film is excellent in polarizing activities and causes no discoloration and deterioration of polarizing activities under a high temperature and high humid conditions. Among the more preferred polarizing film, a polarizing film which comprises one dye of formula(1), one dye selected from group[A] and one dye selected from group[C] is particularly preferred.

Among the disazo dyes of formula(3), the copper complex salt thereof is preferred. That is, Me' in formula(3) is preferably copper.

In formula(3), A1 is phenyl or naphthyl group which may be optionally substituted. Examples of the substituent of the phenyl group include sulfo, sulfamoyl, nitro, $C_1$–$C_4$ alkyl, $C_1$–$C_4$ alkoxy, carboxy, halogen, unsubstituted amino, mono-substituted amino and di-substituted amino. Examples of the substituent of the amino group include $C_1$–$C_4$ alkyl, $C_1$–$C_4$ alkyl which is substituted by hydroxy or cyano and $C_{1-4}$ alkylcarbonyl. Among the phenyl groups denoted by A1, phenyl which is substituted by one or two substituent selected from sulfo, sulfamoyl, nitro, methyl, ethyl, methoxy, ethoxy, carboxy, chlorine, unsubstituted amino and substituted amino is preferred, and sulfophenyl is particularly preferred.

Examples of the group which can be the substituent of the naphthyl denoted by A1 include sulfo and hydroxy. Among the naphthyl group, naphthyl substituted by one, two or three sulfo groups is preferred, and particularly preferred is monosulfonaphthyl or disulfonaphthyl.

In formula(3), B1 is 1,2-naphthylene group which may be optionally substituted. Among them, unsubstituted or substituted 1,2-naphthylene group which is linked with the oxygen atom at position 1 is preferred. Examples of the group which can be the substituent of the 1,2-naphthylene group include sulfo, hydroxy, substituted amino and unsubstituted amino, provided that the hydroxy is not substituted at a position adjacent to the azo group. The substituted amino group may be either mono- or disubstituted and examples of the substituent of the amino include $C_1$–$C_4$ alkyl, $C_1$–$C_4$ alkylcarbonyl, carbamoyl, sulfamoyl, unsubstituted or substituted phenyl and unsubstituted or substituted benzoyl. Examples of the group which can be the substituent of the phenyl group or the benzoyl group include sulfo, amino and $C_1$–$C_4$ alkoxy.

In formula(3), R3 is hydrogen, lower alkyl, lower alkoxy, sulfo or substituted or unsubstituted amino. As the lower alkyl, methyl or ethyl is preferred and particularly preferred is methyl. As the lower alkoxy, methoxy or ethoxy is preferred and particularly preferred is methoxy. The substituted amino can be mono- or disubstituted amino and examples of the group which can be the substituent of the amino group include $C_1$–$C_4$ alkyl, $C_1$–$C_4$ alkylcarbonyl, $C_1$–$C_4$ alkylsulfonyl and carbamoyl.

In formula(4), A2 and B2 is phenyl or naphthyl group which may be optionally substituted. Examples of the group which can be the substituent of the phenyl group include sulfo, sulfamoyl, nitro, $C_1$–$C_4$ alkyl, $C_1$–$C_4$ alkoxy, carboxy, hydroxy, halogen and unsubstituted or substituted amino. Examples of the group which can be the substituent of the naphthyl group include sulfo, hydroxy and unsubstituted or substituted amino. The substituted amino can be mono- or disubstituted amino and examples of the group which can be the substituent of the amino group include $C_1$–$C_4$ alkyl, $C_1$–$C_4$ alkyl which is substituted by hydroxy or cyano, $C_1$–$C_4$ alkylcarbonyl, phenyl, sulfophenyl, disulfophenyl, benzyl and carbamoyl.

The phenyl group denoted by A2 is preferably phenyl which is substituted by one or two substituent selected from sulfo, sulfamoyl, nitro, methyl, ethyl, methoxy, ethoxy, carboxy, chlorine, unsubstituted amino and substituted amino and particularly preferred is sulfophenyl. The naphthyl group denoted by A2 is preferably naphthyl substituted by one, two or three sulfo groups and particularly preferred is monosulfonaphthyl or disulfonaphthyl.

As the phenyl denoted by B2, one of the following is preferred:

① phenyl which is substituted by one or two amino groups which may be optionally substituted, and may be further substituted by hydroxy, sulfo, $C_1$–$C_4$ alkyl, $C_1$–$C_4$ alkoxy or carboxy, or ② phenyl which is substituted by one, two or three hydroxy groups, and may be further substituted by amino, which may be optionally substituted, sulfo, $C_1$–$C_4$ alkyl, $C_1$–$C_4$ alkoxy or carboxy.

As the naphthyl denoted by B2, one of the following is preferred:

① naphthyl which is substituted by one or two hydroxy groups and may be further substituted by sulfo, unsubstituted amino or amino which is substituted by methyl, acetyl, phenyl, sulfophenyl, disulfophenyl or benzoyl, or ② naphthyl which is substituted once or twice by unsubstituted amino or amino which is substituted by methyl, ethyl, hydoxyethyl, cyanoethyl, acetyl or carbamoyl and may be further substituted by hydroxy or sulfo.

In formula(4), R4 is hydrogen, lower alkyl, lower alkoxy, sulfo or amino which may be optionally substituted. The substituted amino can be mono- or di-substituted amino, and examples of the group which can be the substituent of the amino include $C_{1-4}$ alkyl, $C_{1-4}$ alkylcarbonyl, $C_{1-4}$ alkylsulfonyl and carbamoyl. R5 is hydrogen, hydroxy or lower alkoxy. In the case of the trisazo dye of formula(4) forming a copper complex salt, the copper complex salt is formed between the hydroxy group of 1-hydroxy-3-sulfo-2, 6naphthylene group in formula(4) (it may have sulfo at 5-position) and the hydroxy group denoted by R5.

The disazo dye represented by formula(3) can be produced according to a known process such as the process described in DE 32 36 238 A or JP-B-64-5623, which comprises a conventional diazotization, coupling reaction and formation of metal complex salt.

The trisazo dye represented by formula(4) or a copper-complex salt thereof can be produced according to a known process such as a process described in JP-A-2-75672 which comprises a conventional diazotization and coupling reaction and, in the case of the copper complex salt, further comprises a formation of copper complex salt.

Preferable examples of [A] the disazo dye of formula(3) include dyes of which the free acid forms are represented by the formulae (3-1 )–(3-24) mentioned below.

Preferable examples of [B] the trisazo dye of the formula(4) and its copper complex salt include dyes of which the free acid forms are represented by the formulae (4-1)–(4-1) mentioned below.

These dyes are usually used in the form of sodium salt, though they can also be used in the form of free acid, other alkali metal salt, such as litium salt or potassium salt, ammonium salt or amine salt, such as ethanolamine salt or alkylamine salt.

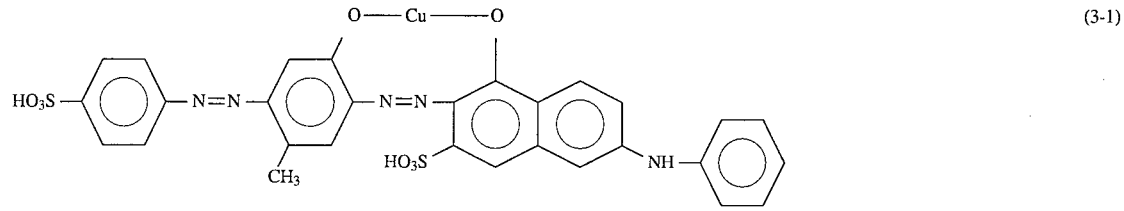
(3-1)

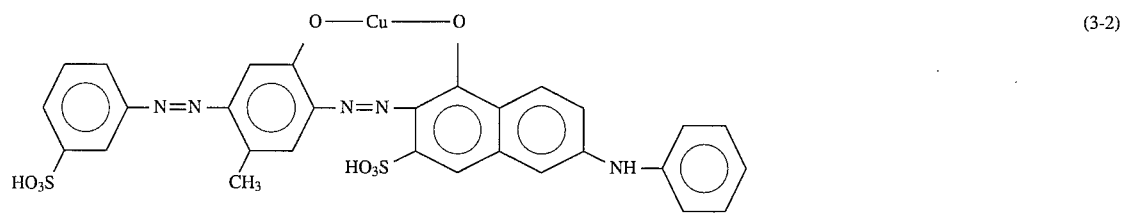
(3-2)

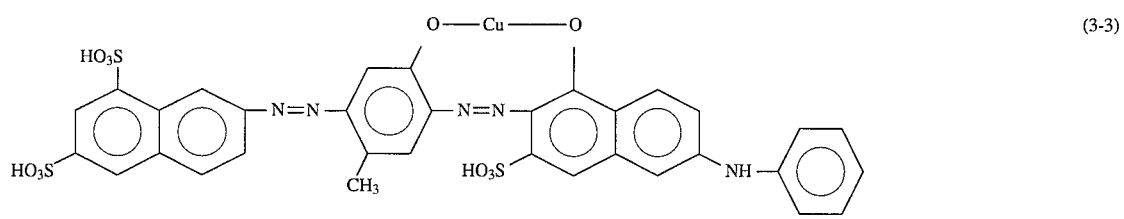
(3-3)

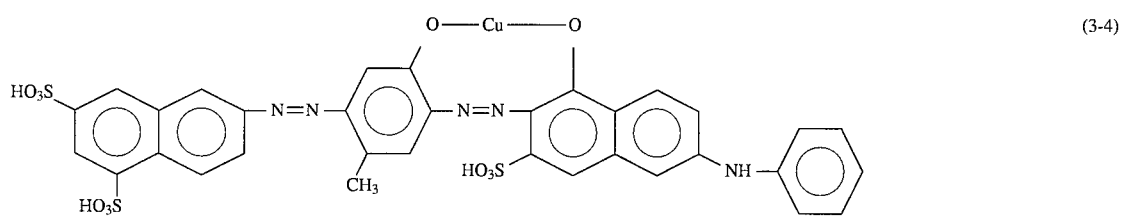
(3-4)

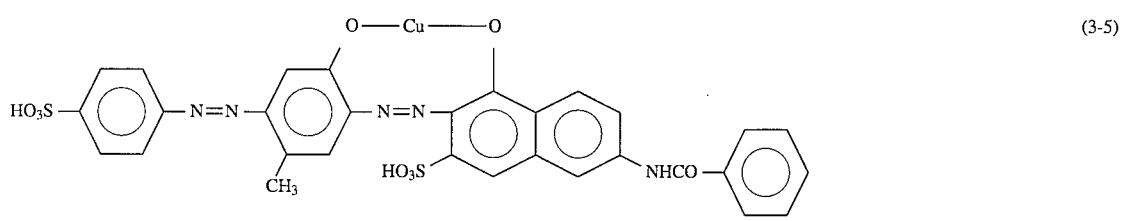
(3-5)

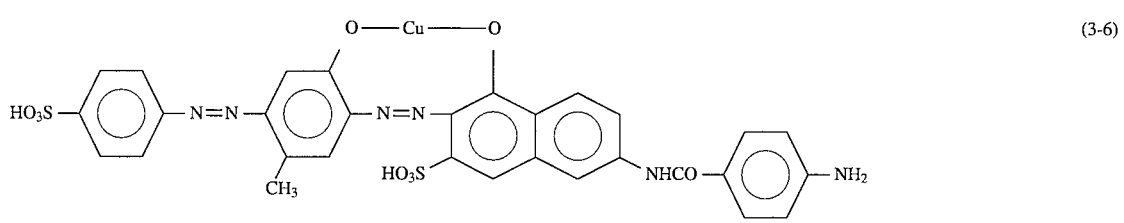
(3-6)

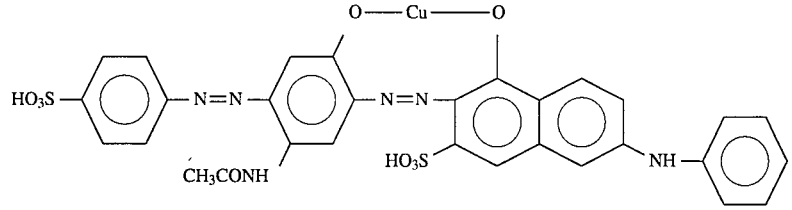
(3-7)
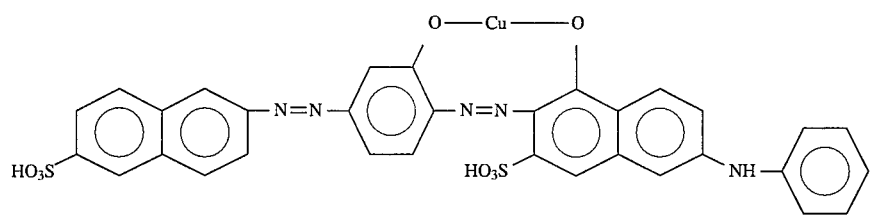
(3-8)
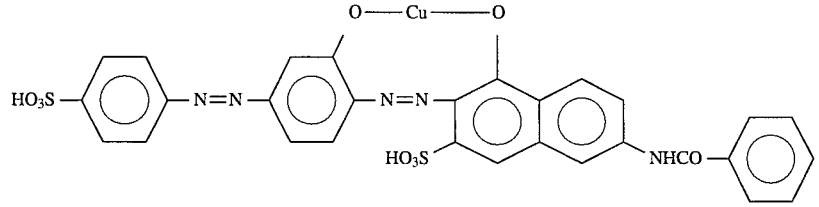
(3-9)
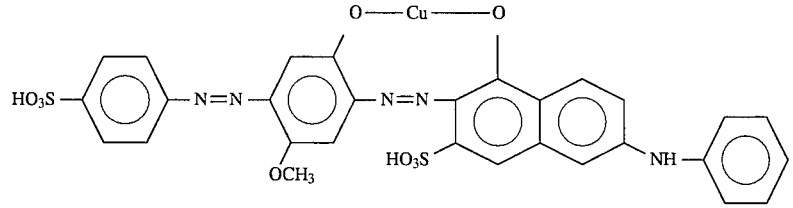
(3-10)
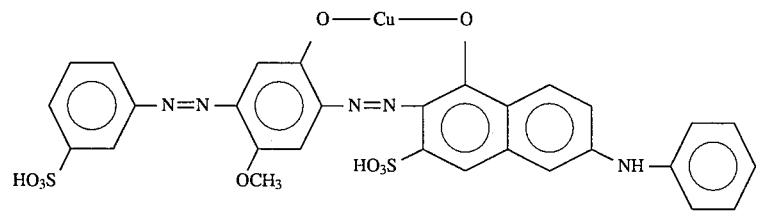
(3-11)
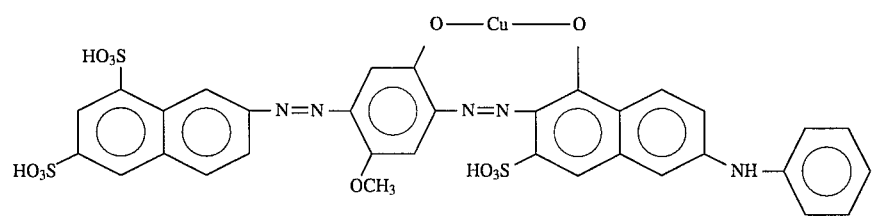
(3-12)
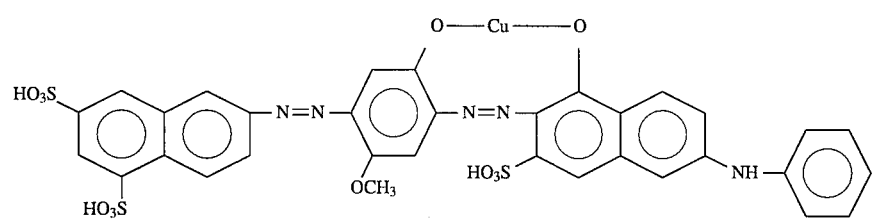
(3-13)

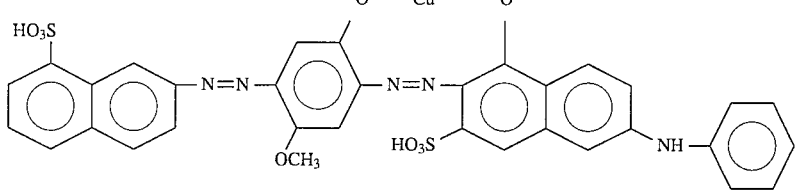
(3-14)
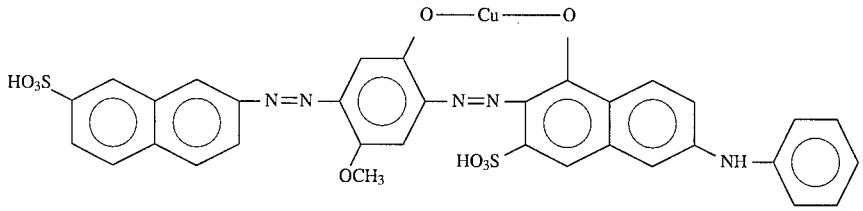
(3-15)
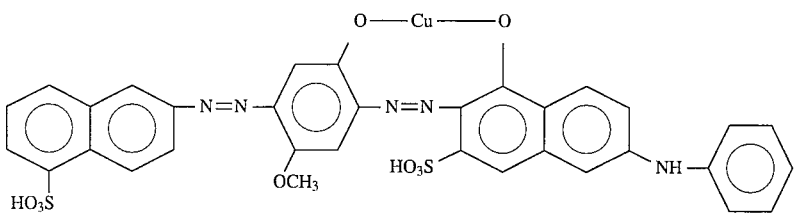
(3-16)
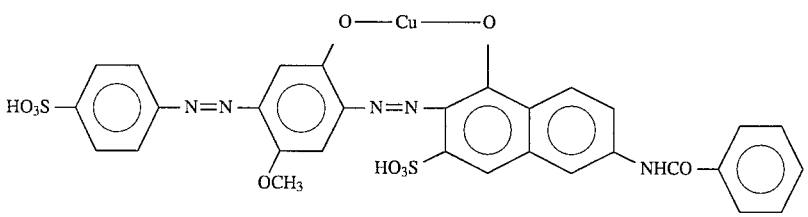
(3-17)
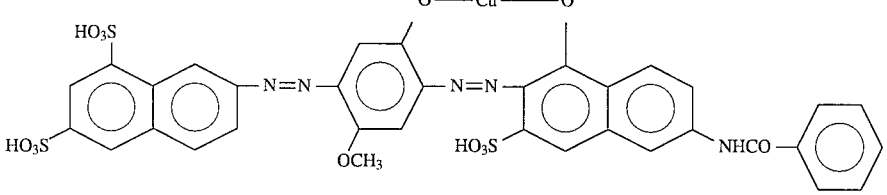
(3-18)
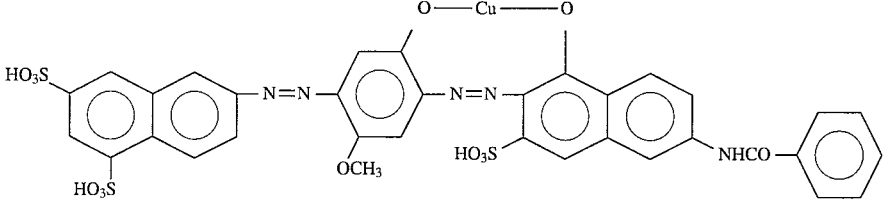
(3-19)
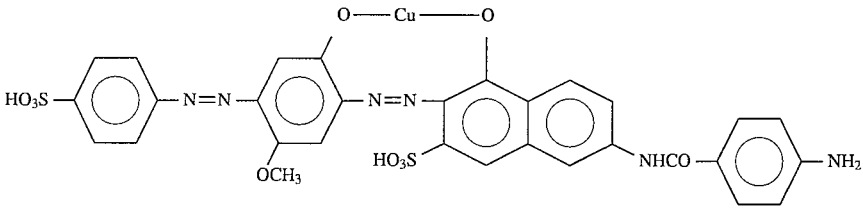
(3-20)

-continued
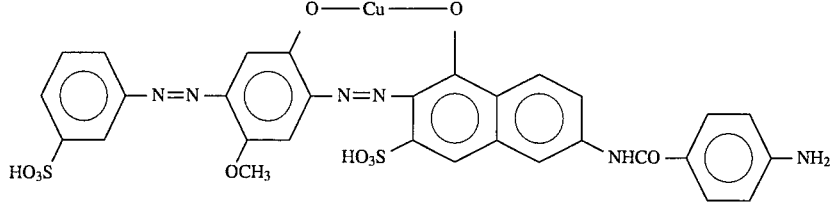  (3-21)
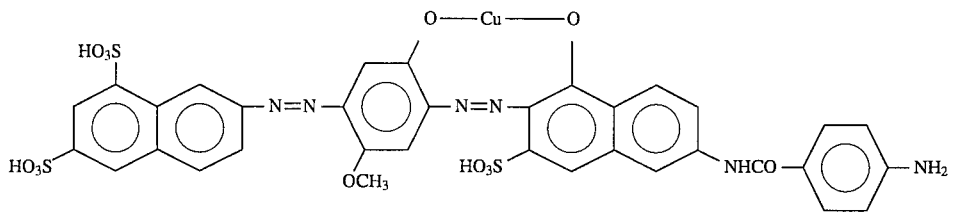  (3-22)
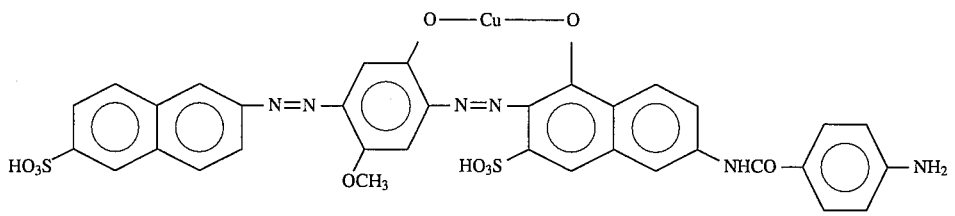  (3-23)
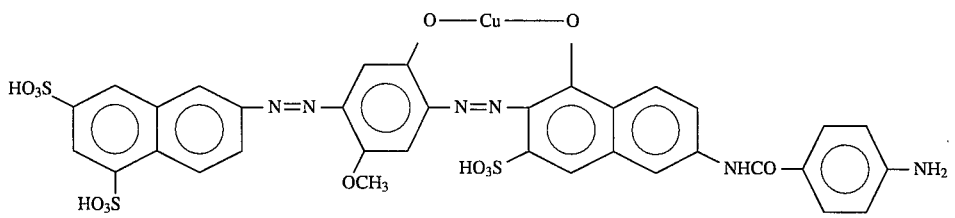  (3-24)
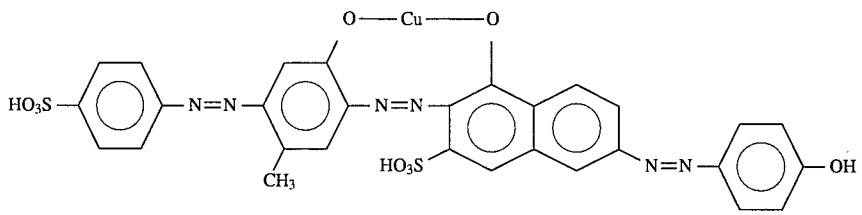  (4-1)
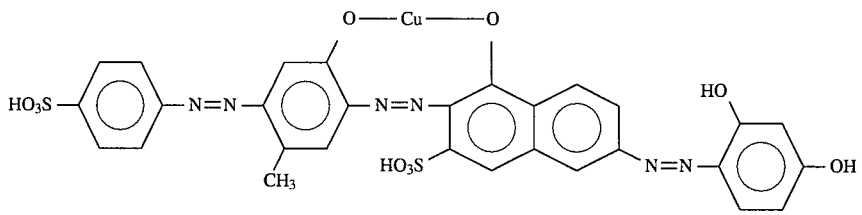  (4-2)
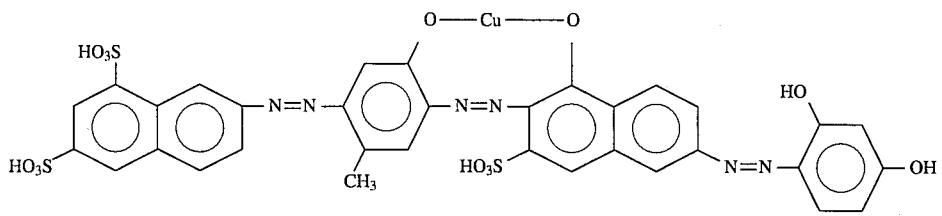  (4-3)

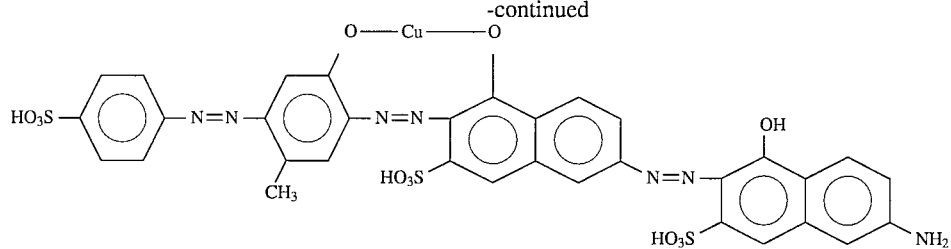
(4-4)
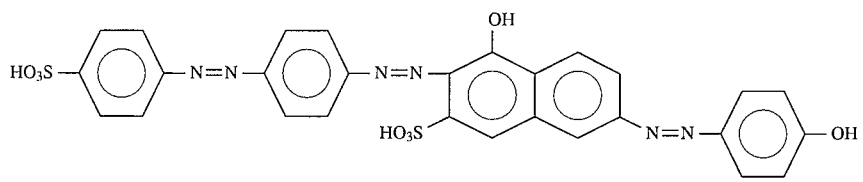
(4-5)
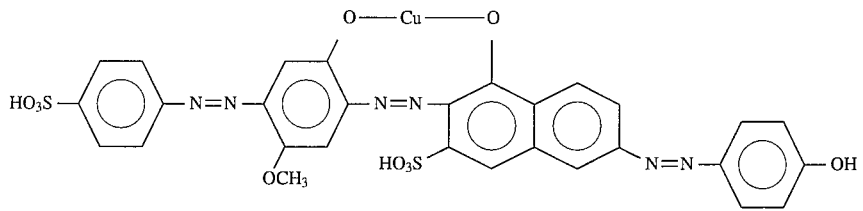
(4-6)
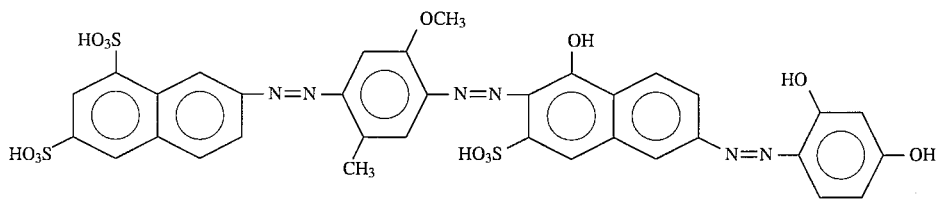
(4-7)
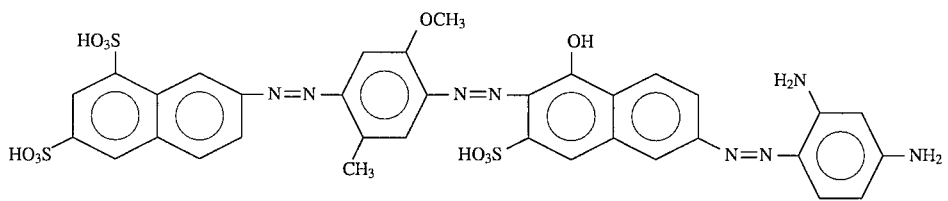
(4-8)
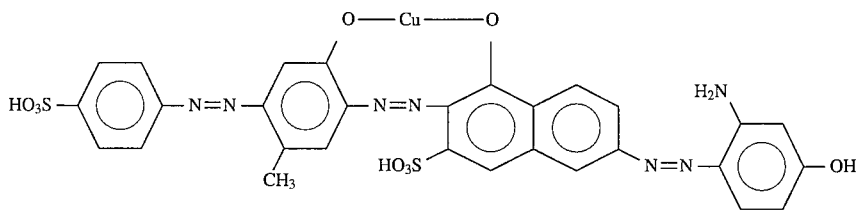
(4-9)
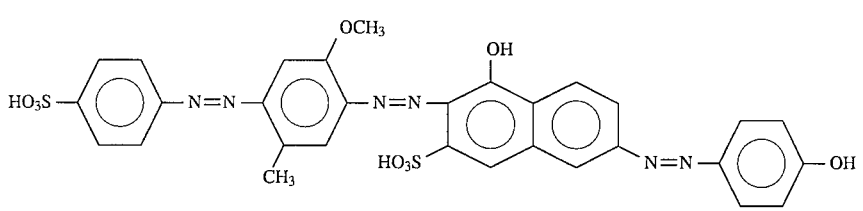
(4-10)
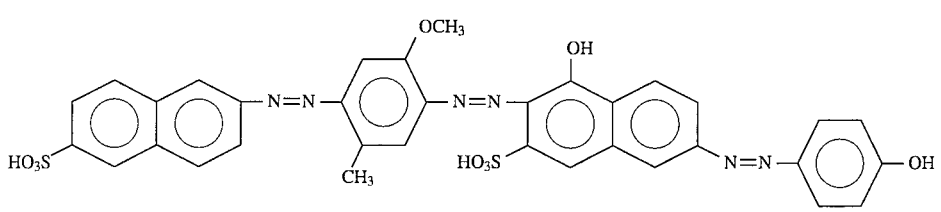
(4-11)

The dyes of group[C] are commercially available and can be obtained easily. They are on the market by Sumitomo Chemical Co., Ltd, and their Color Index Generic Names and trade names are described below:

C.I. Direct Yellow 12
  (trade name: Chrysophenine),
C.I. Direct Yellow 28
  (trade name: Sumilight Supra Yellow BC conc.),
C.I. Direct Yellow 44
  (trade name: Direct Fast Yellow GC),
C.I. Direct Orange 26
  (trade name: Direct Fast Orange S),
C.I. Direct Orange 39
  (trade name: Sumilight Supra Orange 2GL 125%),
C.I. Direct Orange 107
  (trade name: Sumilight Supra Orange GD extra conc.),
C.I. Direct Red 2
  (trade name: Benzopurpurine 4B),
C.I. Direct Red 31
  (trade name: Nippon Fast Red BB conc.),
C.I. Direct Red 79
  (trade name: Sumilight Supra Red 4BL 170%),
C.I. Direct Red 81
  (trade name: Sumilight Red 4B) and
C.I. Direct Red 247
  (trade name: Japanol Fast Red FA).

The polarizing film of the present invention can be produced by incorporating dichromatic dyes of formula(1) and/or (2) and, if desired, other organic dyes into a film for substrate of the polarizing film according to a known method. As the film substrate, usually a polymer film is used.

Examples of the polymer film usable for the substrate of the polarizing film include polyvinyl alcohol or derivatives thereof; the same which is modified with an olefin such as ethylene and propylene, an unsaturated fatty acid such as crotonic acid, acrylic acid, methacrylic acid or maleic acid; EVA (ethylene-vinyl acetate) resin; a saponified EVA resin; a nylon resin; and a polyester resin.

A film of polyvinyl alcohol or derivatives thereof is particularly preferred from the view points of the dye fixation and the orientation.

Incorporation of the dichromatic dye into a polymer film is carried out usually by dyeing the polymer film. The dyeing is, for example, carried out by dipping the polymer film in a dye bath prepared by dissolving the dichromatic dye in water. Though the dye concentration in the dye bath is not limited, it is usually in the range from 0.0001 to 10% by weight. If desired, a dyeing auxiliary, such as sodium sulfate, preferably the concentration being from 1 to 10% by weight, may be used. Dyeing temperature is from 40° to 80° C. to obtain preferable dye performance.

When at least two dyes selected from above-mentioned groups [A], [B] and [C] are used in addition to the dye of formula(1) and/or the dye of formula(2), their ratio is not critical, but usually the ratio of the total weight of the two or more dyes selected from groups [A], [B] and [C] to the total weight of the dye of formula(1) and/or of formula(2) is from 0.1 to 5.0

The orientation of the dichromatic dye incorporated in the polymer film is conducted by stretching the film. Stretching the polymer film can be conducted according to a known method such as a wet stretching method or a dry stretching method. It may be conducted prior to the dyeing.

If desired, the oriented polymer film containing the dichromatic dyes is subjected to a post-treatment such as a boric acid treatment according to a known manner in order to improve the light transmittance and polarizing activities of the polarizing film. Conditions for the boric acid treatment vary depending on the types of the polymer film and the dichromatic dyes employed. Usually, however, the treatment is carried out in aqueous boric acid solution having the concentration of from 1 to 15% by weight, preferably from 5 to 10% by weight, at a temperature of from 30° to 80° C., preferably from 50° to 75° C.

In combination with the boric acid treatment, if desired, the polymer film may further be subjected to a fixing treatment in aqueous solution containing a cationic polymer compound.

The dye-containing polarizing film thus obtained may be laminated with a protective film having excellent optical transparency and mechanical strength, on one or both sides of the film, to form a polarizing plate. As examples of the materials for the protective film, a fluorine type film such as tetrafluoroethylene/hexafluoropropylene copolymer film, polyester resin film, polyolefin resin film and polyamide resin film, as well as cellulose acetate film and acrylic film, which have been conventionally used, can be mentioned.

As mentioned above, a polarizing film having excellent polarizing activities and durability to moisture and heat can be obtained by incorporating the dye of formula(1) and/or the dye of formula(2) into a film substrate. A polarizing film having neutral color while keeping excellent polarizing activities and durability can be obtained by incorporating other organic dye(s) in addition to the dye of formula(1) and/or the dye of formula(2). Particularly, by incorporating at least two dyes selected from the above-mentioned group [A], [B] and [C] in addition to the dye of formula(1) and/or the dye of formula(2), a polarizing film which is little pervious to light at crossed state over the visible wavelength region while keeping excellent polarizing activities and durability can be obtained.

The present invention is now explained in more details with reference to the examples, which are only illustrative, and never construed to limit the invention. In the examples, "part" and "%" mean "part by weight" and "% by weight" respectively unless otherwise mentioned. In the formulae in the examples, the group represented by the following formula;

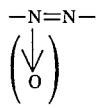

is an azoxy group or a mixture of azo group and azoxy group.

SYNTHESIS EXAMPLE 1

To 300 parts of water, 24 parts of 2-amino-5-hydroxynaphthalene-1,7-disulfonic acid was added and dissolved by using 28% aqueous sodium hydroxide solution. While keeping the resulting solution at pH10, aqueous solution of a diazonium compound which had been obtained by diazotizing 7 parts of p-nitroaniline was added thereto and the coupling reaction was carried out. After the coupling reaction was completed, the reaction mass was adjusted at pH7 and filtered to obtain a monoazo compound of which the free acid form is represented by the following formula:

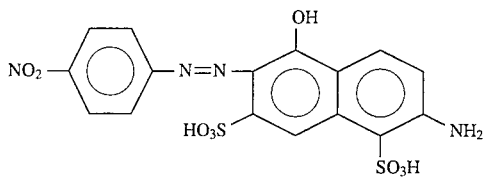

The monoazo compound was added to 400 parts of water and dissolved. After making the resulting solution strongly alkaline condition, 8 parts of glucose was added thereto and the reduction was carried out at 40° C. After the reaction was completed, the reaction mass was adjusted at pH7 and filtered to obtain a compound of which the free acid form is represented by the following formula(a):

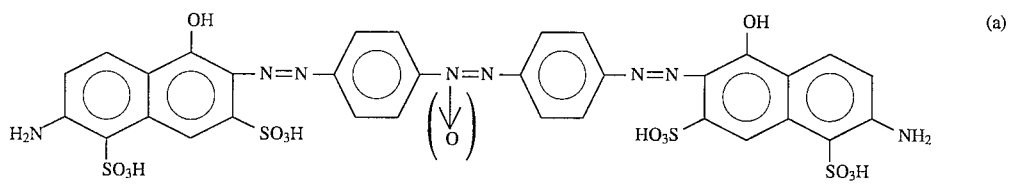
(a)

Measured in an aqueous medium, $\lambda_{max.}$ of this compound is 540 nm. Mass spectrum of this compound has a signal corresponding to molecular weight of the compound represented by the following formula in the free acid form:

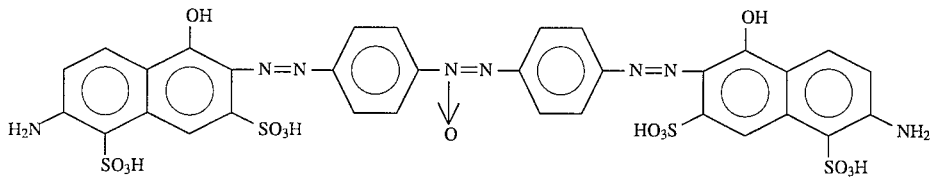

SYNTHESIS EXAMPLE 2

Into 300 parts of water, 22 parts of 1-amino-8-hydroxynaphthalene-2,4-disulfonic acid was added and dissolved by using 28% aqueous sodium hydroxide solution. While keeping the resulting solution at pH10, aqueous solution of a diazonium compound which had been obtained by diazotizing 8 parts of p-nitro-o-anisidine was added thereto and the coupling reaction was carried out. After the coupling reaction was completed, the reaction mass was adjusted at pH7 and filtered to obtain a monoazo compound of which the free acid form is represented by the following formula:

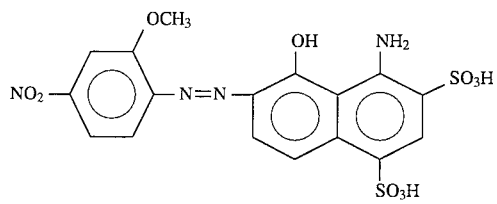

The monoazo compound was added to 400 parts of water and dissolved. After making the resulting solution strongly alkaline condition, 8 parts of glucose was added thereto and the reduction was carried out at 40° C. After the reaction was completed, the reaction mass was adjusted at pH7 and filtered to obtain a compound of which the free acid form is represented by the following formula:

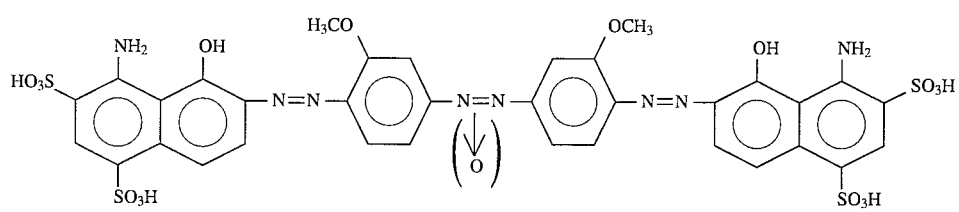

The compound thus obtained was dissolved in 380 parts of water. Keeping the temperature of the solution at 85° C., 15 parts of monoethanol amine and 250 parts of 5% aqueous copper sulfate solution was added thereto to form the copper complex salt of the compound. After the reaction to form the copper complex salt was completed, the reaction mass was adjusted at pH7, salted out by adding sodium chloride and filtered to obtain a compound of which the free acid form is represented by the following formula(b):

The compound thus obtained was dissolved in 500 parts of water. While keeping the temperature of the solution at 95° C., 15 parts of monoethanol amine and 250 parts of 5% copper sulfate solution was added thereto to form the copper complex salt of the compound. After the reaction to form the copper complex salt was completed, the reaction mass was adjusted at pH7, salted out by adding sodium chloride and filtered to obtain a compound of which the free acid form is represented by the following formula:

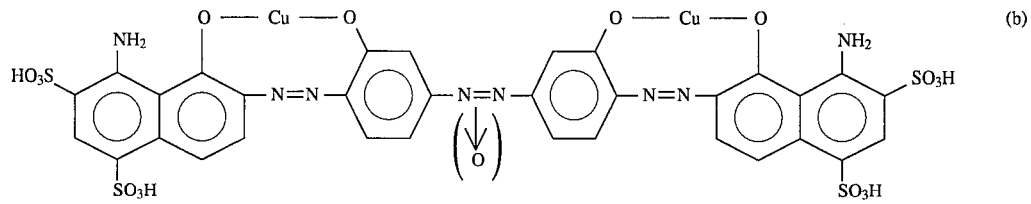

Measured in an aqueous medium, $\lambda_{max.}$ of this compound is 638 nm.

SYNTHESIS EXAMPLE 3

Into 300 parts of water, 16 parts of 1-amino-8-hydroxynaphthalene-3,6-disulfonic acid was added and dissolved

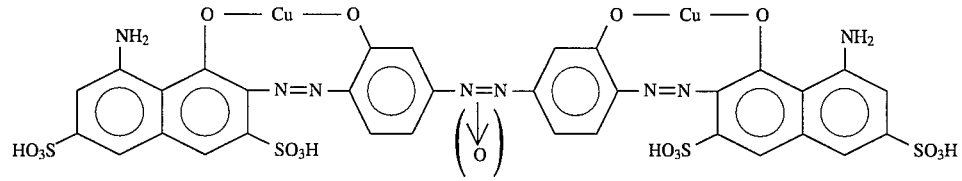

by using 28% aqueous sodium hydroxide solution. While keeping the resulting solution at 5° C. and pH10, aqueous solution of a diazonium compound which had been obtained by diazotizing 8 parts of p-nitro-o-anisidine was added thereto and the coupling reaction was carried out. After the coupling reaction was completed, the reaction mass was salted out by adding sodium chloride and filtered to obtain a monoazo compound of which the free acid form is represented by the following formula:

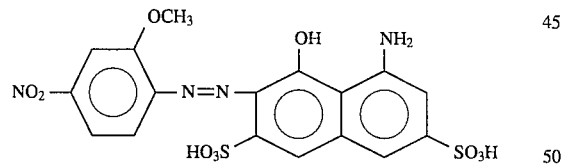

The monoazo compound thus obtained was dissolved in 300 parts of water. After making the resulting solution strongly alkaline condition, 5 parts of glucose was added thereto and the reduction was carried out at 40° C. After the reaction was completed, the reaction mass was adjusted at pH7 and filtered to obtain a compound of which the free acid form is represented by the following formula:

Then, the compound was dissolved in 500 parts of water and 44 parts of ethylenediamine tetraacetic acid was added to the resulting solution. After pH of the solution was adjusted at 5.5, while keeping the temperature of the solution at 60° C., the reaction was carried out for two hours. After the reaction was completed, the reaction mass was salted out by adding sodium chloride and filtered to obtain a compound of which the free acid form is represented by the following formula(c):

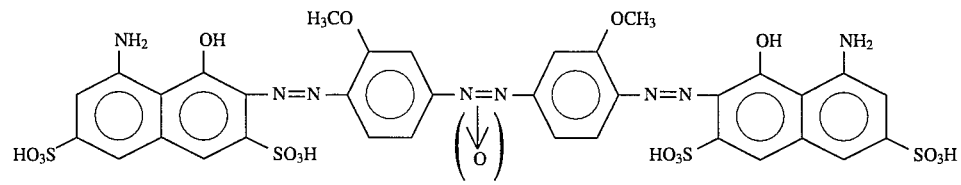

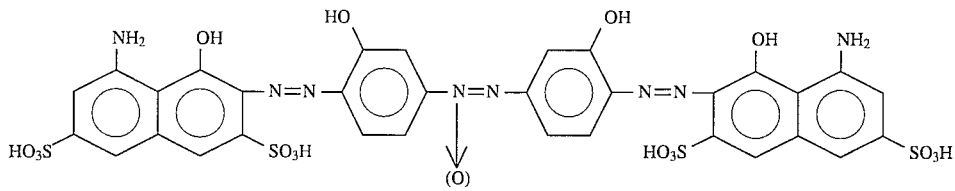

(c)

Measured in an aqueous medium, $\lambda_{max.}$ of this compound is 625 nm.

SYNTHESIS EXAMPLE 4

Synthesis Example 3 was repeated, except that 1-amino-8-hydroxynaphthalene-3,6-disulfonic acid was replaced by 1-amino-8-hydroxynaphthalene-4,6-disulfonic acid to obtain a compound of which the free acid form is represented by the following formula(d):

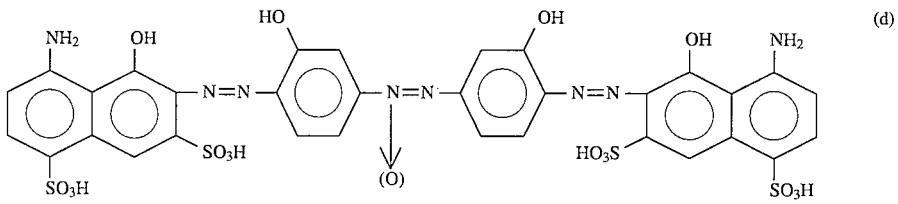

(d)

Measured in an aqueous medium, $\lambda_{max.}$ of this compound is 620 nm.

By using the dyes obtained in Synthesis Examples or other dyes, polarizing films were prepared as described in the following Examples. In the following Examples, light transmittance was measured by TC-1800M manufactured by Tokyo Denshoku Ltd. "T" represents the value of light transmittance at a specific wave length and "Y" represents the value of "visible sensitivity adjust light transmittance" calculated according to JIS Z 8701 (Specification of Colors According to XYZ Standard Colorimetric System and $X_{10}Y_{10}Z_{10}$ Supplementary Standard Colorimetric System). The term "single transmittance" means "T" or "Y" measured for one piece of the polarizing film.

T(parallel) and Y(parallel) are values of T and Y of two pieces of the polarizing films, respectively, which are measured in the state wherein the both films are superposed upon each other so that they have same orientation directions (these light transmittances are called parallel light transmittance). T(cross) and Y(cross) are values of T and Y of two pieces of the polarizing film, respectively, which are measured at crossed state(these light transmittances are called "cross light transmittance".).

The term "degree of polarization (P)" in Examples 1, 3 and 4 means a value obtained from T(parallel) and T(cross) measured at $\lambda_{max.}$ according to the following equation.

$$P = \sqrt{\frac{T(\text{parallel}) - T(\text{cross})}{T(\text{parallel}) + T(\text{cross})}} \times 100$$

The term "degree of polarization (Py)" in Example 6 means a value obtained from Y(parallel) and Y(cross) according to the following equation.

$$Py = \sqrt{\frac{Y(\text{parallel}) - Y(\text{cross})}{Y(\text{parallel}) + Y(\text{cross})}} \times 100$$

$\Delta T(\text{cross})$ represent the difference between the maximum and the minimum values of cross light transmittance T(cross) measured within the wavelength range of 400–700 nm. Tmax(cross) represent the maximum value of cross light transmittance T(cross) measured within the wavelength range of 400–700 nm. $\Delta T(\text{cross})$ and Tmax(cross) are parameters indicating the degree of perviousness of the film to light at crossed state.

EXAMPLE 1.

A polyvinyl alcohol film of 75 μm in thickness (Kuraray Vinylon #7500 manufactured by Kuraray Co., Ltd.) was stretched to five times of its original length in a longitudinal uniaxial direction to prepare the substrate of a polarizing film. The resulting film was dipped for 12 minutes, as kept in the tensional state, into aqueous solution of sodium salt of dye of formula(a) and sodium sulfate at 65° C., wherein the concentrations of the dye and sodium sulfate are 0.025% and 2%, respectively. Thereafter, the film was dipped into 7.5% aqueous boric acid solution at 65° C. for 5 minutes and then washed with 20° C. water for 20 seconds to obtain a polarizing film. The polarizing film thus obtained had high polarizing activities and did not cause discoloration even after having been kept for a long period of time at a high temperature under a highly humid condition. The light polarization characteristics of the polarizing film are shown in Table 1.

EXAMPLE 2.

Example 1 was repeated, except that the dye used in Example 1 was replaced by sodium salt of the dye of formula(b) to obtain a polarizing film. The polarizing film thus obtained did not cause discoloration even after having been kept for a long period of time at a high temperature under a highly humid condition.

EXAMPLE 3.

Example 1 was repeated, except that the dye used in Example 1 was replaced by sodium salt of dye of formula(c) to obtain a polarizing film. The polarizing film thus obtained had high polarizing activities. The light polarization characteristics of the polarizing film are shown in Table 1.

EXAMPLE 4.

Example 1 was repeated, except that the dye used in Example 1 was replaced by sodium salt of dye of formula(d) to obtain a polarizing film. The polarizing film thus obtained had high polarizing activities. The light polarization characteristics of the polarizing film are shown in Table 1.

TABLE 1

| Example No. | $\lambda_{max.}$ nm | single transmittance (T) % | degree of polarization (P) % |
|---|---|---|---|
| 1 | 540 | 42.2 | 99.4 |
| 3 | 650 | 42.0 | 99.2 |
| 4 | 650 | 42.2 | 98.8 |

EXAMPLE 5.

A polyvinyl alcohol film of 75 µm in thickness (Kuraray Vinylon #7500 manufactured by Kuraray Co., Ltd.) was stretched to four times of its original length in a longitudinal uniaxial direction to prepare the substrate of a polarizing film. The resulting film was dipped for 10 minutes, as kept in the tensional state, into aqueous solution of sodium salt of dye of formula(a), sodium salt of dye of formula(b), C.I. direct orange 39 and sodium sulfate at 60° C., wherein the concentrations of the dye of formula(a), the dye of formula(b), C.I. direct orange 39 and sodium sulfate are 0.012%, 0.105%, 0.008% and 2%, respectively. Thereafter, the film was dipped into 7.5% aqueous boric acid solution at 65° C. for 10 minutes and then washed with 20° C. water for 30 seconds to obtain a polarizing film. The polarizing film thus obtained has a neutral color and did not cause discoloration even after having been kept for a long period of time at a high temperature under a highly humid condition.

EXAMPLE 6.

A polyvinyl alcohol film of 75 µm in thickness (Kuraray Vinylon #7500 manufactured by Kuraray Co., Ltd.) was stretched to five times of its original length in a longitudinal uniaxial direction to prepare the substrate of polarizing film. The resulting film was dipped for 8 minutes, as kept in the tensional state, into aqueous solution of sodium salt of dye of formula(a), sodium salt of dye of formula(3-20), C.I. direct orange 39 and sodium sulfate at 70° C., wherein the concentrations of the dye of formula(a), the dye of formula(3-20), C.I. direct orange 39 and sodium sulfate are 0.0195%, 0.05%, 0.0085% and 2%, respectively. Thereafter, the film was dipped into 7.5% aqueous boric acid solution at 69° C. for 5 minutes and then washed with 20° C. water for 20 seconds to obtain a polarizing film. The polarizing film had high degree of polarization and was little pervious to light at crossed state. The light polarization characteristics of the polarizing film are shown below:

Single transmittance Y=40.1%

Degree of polarization Py=99.2%

Tmax(cross)=1.08%

ΔT(cross)=1.02%.

The polarizing film thus obtained has a neutral color and did not cause discoloration even after having been kept for a long period of time at a high temperature under a highly humid condition.

EXAMPLES 7–24

Example 1 was repeated, except that sodium salt of the dye used in Example 1 was replaced by sodium salt of a dye shown in Table 2 to obtain a polarizing film.

In the Table 2, $\lambda_{max.}$ means $\lambda_{max.}$ measured as the polarizing film.

| Exp. No. | FORMULA | λmax (nm) |
|---|---|---|
| 7 | (structure with NH₂, OH, SO₃H groups on naphthalene rings connected via -N=N- linkages through phenyl groups) | 580 |
| 8 | (structure with HOOC, OH, SO₃H groups connected via -N=N- linkages) | 560 |
| 9 | (structure with HO₃S, NH₂ groups connected via -N=N- linkages) | 500 |

| Exp. No. | FORMULA | λmax (nm) |
|---|---|---|
| 10 | 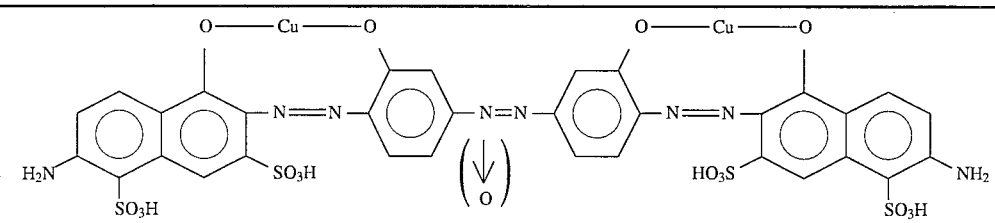 | 610 |
| 11 | 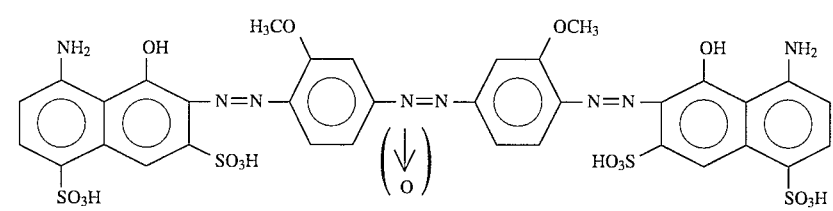 | 600 |
| 12 | 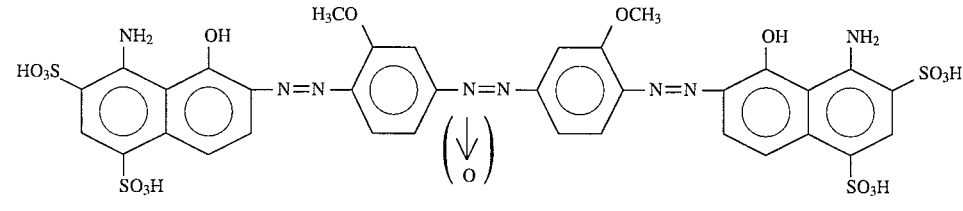 | 650 |
| 13 | 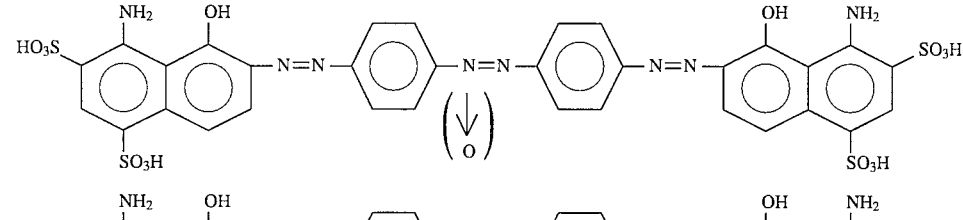 | 640 |
| 14 | 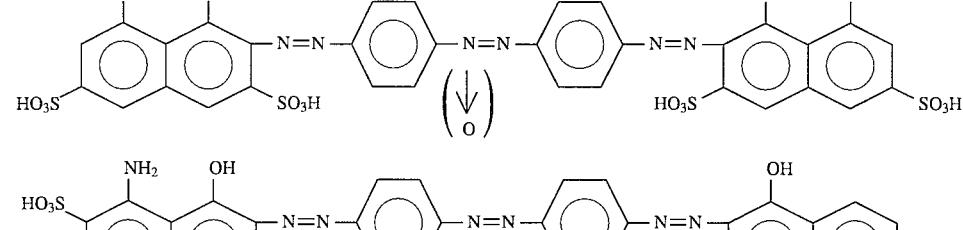 | 620 |
| 15 | 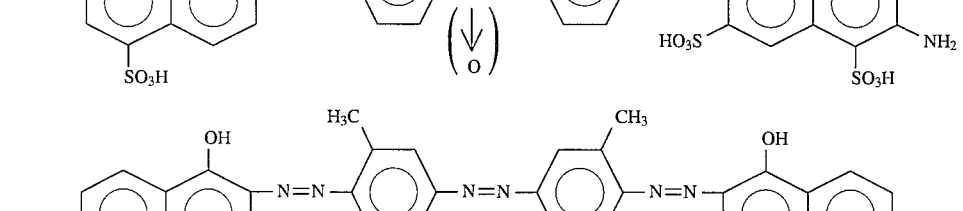 | 580 |
| 16 | 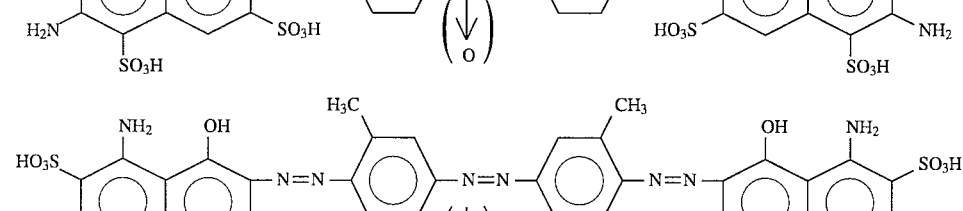 | 550 |
| 17 | 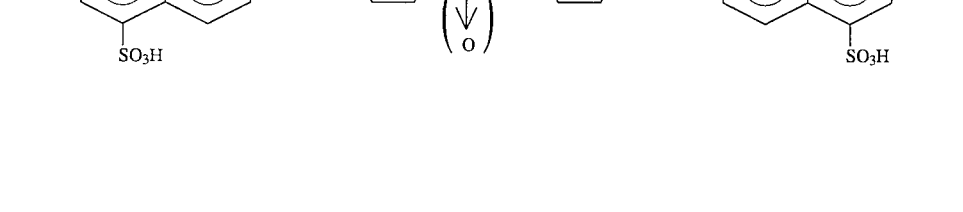 | 650 |

| Exp. No. | FORMULA | λmax (nm) |
|---|---|---|
| 18 | | 580 |
| 19 | | 580 |
| 20 | | 580 |
| 21 | | 580 |
| 22 | | 590 |
| 23 | | 570 |
| 24 | | 610 |

The dye-containing polarizing film of the present invention exhibits high polarizing activities not smaller than those of a iodine containing polarizing film and has excellent durability. Hence, the polarizing film of the present invention is preferably applied to a variety of liquid crystal displays, particularly to displays for automobiles which require excellent polarizing activities and durability and to displays for industrial instruments used in a variety of circumstances. By using several types of the specific dye in combination, a polarizing film which is little pervious to light at crossed state over the visible wavelength region can be obtained.

This invention also provides dyes suitable for producing the polarizing film.

What we claim is:

1. A dye-containing polarizing film which comprises, in a film substrate, at least one dye selected from, 1) a dye represented by the following formula (1):

$$Q^1-N=N-Q^2-X-Q^3-N=N-Q^4 \quad (1)$$

wherein:

Q1 and Q4, which are the same or different, are each independently naphthyl group which is substituted by at least one group selected from hydroxy or amino, and may be further substituted by sulfo, carboxy, C1–C4 alkylamino, C1–C4 alkylcarbonylamino, phenylamino or benzoyl amino;

Q2 and Q3, which are the same or different, are each unsubstituted phenylene or phenylene group substituted by one or two substituents from hydroxy, C$_1$–C$_4$alkyl, C$_1$–C$_4$ alkoxy and sulfo; and X is —N=N— or

and 2) a dye represented by the following formula (2):

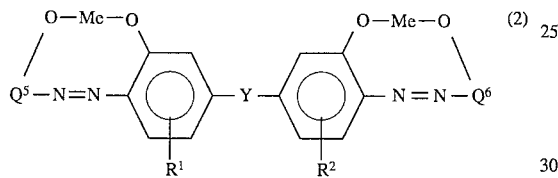

wherein:

each Me is a transition metal selected from copper, nickel, zinc and iron;

Q$^5$ and Q$^6$, which are the same or different, are each 1,2-naphthylene group unsubstituted or substituted by substituent selected from amino, sulfo, hydroxy, carboxy, C$_1$–C$_4$ alkyl and C$_1$–C$_4$ alkoxy;

Y is —N=N— or

and

R$^1$ and R$^2$, which are the same or different, are each hydrogen atom, lower alkyl, lower alkoxy or sulfo group.

2. The polarizing film according to claim 1 which comprises the dye of formula(1) wherein X is azoxy.

3. The polarizing film according to claim 1 which comprises at least two dyes selected from the group consisting of the dye of formula (1) wherein X is azo and the dye of formula (1) wherein X is azoxy.

4. The polarizing film according to claim 1 which comprises the dye of formula(2) wherein Me is copper.

5. The polarizing film according to claim 1 which comprises the dye of formula(2) wherein Y is azoxy.

6. The polarizing film according to claim 1 which comprises at least two dyes selected from the group consisting of the dye of formula (2) wherein Y is azo and the dye of formula (2) wherein Y is azoxy.

7. The polarizing film according to claim 1 which comprises at least one organic dye in addition to the dye of formula(1) and/or the dye of formula(2).

8. The polarizing film according to claim 7 which comprises at least two dyes selected from:

[A] a disazo dye represented by the following formula (3)

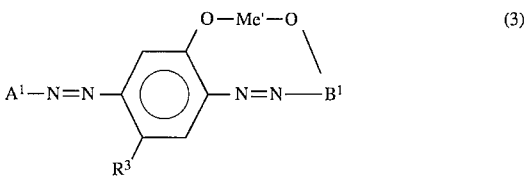

wherein:

Me' is transition metal selected from the group consisting of copper, nickel, zinc and iron;

A$^1$ is a phenyl group which may be optionally substituted by sulfo, sulfamoyl, nitro, C$_1$–C$_4$ alkyl, C$_1$–C$_4$ alkoxy, carboxy, halogen, or amino, which may be substituted once or twice by C$_1$–C$_4$ alkyl, C$_1$–C$_4$ alkyl which is substituted by hydroxy or cyano and C$_1$–C$_4$ alkylcarbonyl, or a napthyl group which may be optionally substituted by sulfo or hydroxy, B$^1$ is 1,2-naphthylene group which may be optionally substituted by sulfo, hydroxy or amino, which may be substituted by C$_1$–C$_4$ alkyl, C$_1$–C$_4$ alkylcarbonyl, carbamoyl, sulfamoyl, phenyl or benzoyl, wherein the phenyl or benzoyl may be further substituted by sulfo, amino or C$_1$–C$_4$ alkoxy provided that the hydroxy is not substituted at a position adjacent to the azo group; and R$^3$ is an amino group which may be optionally substituted by C$_1$–C$_4$ alkyl, C$_1$–C$_4$ alkylcarbonyl, C$_1$–C$_4$ alkylsulfonyl or carbamoyl, or hydrogen atom, C$_1$–C$_2$ alkyl, C$_1$–C$_2$ alkoxy or sulfo group;

[B] a trisazo dye represented by the following formula(4) in the free acid form and copper complex salt thereof,

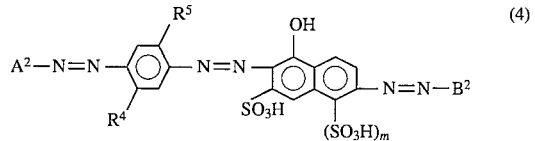

wherein:

A$^2$ is the same as A$^1$;

B$^2$ is (1) phenyl which is substituted by one or two amino groups which may be optionally substituted, and may be further substituted by hydroxy, sulfo, C$_1$–C$_4$ alkyl, C$_1$–C$_4$ alkoxy or carboxy, (2) phenyl which is substituted by one, two or three hydroxy groups, and may be further substituted by amino, which may be optionally substituted by, sulfo, C$_1$–C$_4$ alkyl, C$_1$–C$_4$ alkoxy or carboxy, (3) naphthyl which is substituted by one or two hydroxy groups and may be further substituted by sulfo, unsubstituted amino or amino which is substituted by methyl, acetyl, phenyl, sulfophenyl, disulfophenyl or benzoyl, or (4) naphthyl which is substituted one or twice by unsubstituted amino or amino which is substituted by methyl, ethyl, hydroxyethyl, cyanoethyl, acetyl or carbamoyl and may be further substituted by hydroxy or sulfo;

R$^4$ is hydrogen, methyl, methoxy, sulfo or amino which may be optionally substituted once or twice by C$_1$–C$_4$ alkyl, C$_1$–C$_4$ alkylcarbonyl, C$_1$–C$_4$ alkylsulfonyl and carbamonyl;

R$^5$ is hydrogen atom, hydroxy or methoxy group; and m is 0 or 1; and

[C] C.I. Direct Yellow 12, C.I. Direct Yellow 28, C.I. Direct Yellow 44, C.I. Direct Orange 26, C.I. Direct Orange 39, C.I. Direct Orange 107, C.I. Direct Red 2, C.I. Direct Red 31, C.I. Direct Red 79, C.I. Direct Red 81 and C.I. Direct Red 247.

9. The polarizing film according to claim 8 which comprises at least one disazo dye of formula(3) wherein Me' is copper.

10. The polarizing film according to claim 8 which comprises at least one dye of formula(1), at least one disazo dye selected from group [A] and at least one dye selected from group [C].

11. The polarizing film according to claim 1 wherein the substrate is a film of polyvinyl alcohol or a derivative thereof.

* * * * *